United States Patent
Sato et al.

(10) Patent No.: US 9,197,064 B2
(45) Date of Patent: Nov. 24, 2015

(54) POWER EQUIPMENT CONTROL SYSTEM

(75) Inventors: Yasuo Sato, Hitachinaka (JP); Taichiro Kawahara, Tokai (JP); Masato Saito, Hitachi (JP); Eisuke Kuroda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 13/523,381

(22) Filed: Jun. 14, 2012

(65) Prior Publication Data

US 2012/0323395 A1 Dec. 20, 2012

(30) Foreign Application Priority Data

Jun. 16, 2011 (JP) .................... 2011-133800

(51) Int. Cl.
*H02J 3/00* (2006.01)
*H02J 13/00* (2006.01)
*H02J 3/14* (2006.01)

(52) U.S. Cl.
CPC ............ *H02J 3/008* (2013.01); *H02J 13/0079* (2013.01); *H02J 2003/003* (2013.01); *H02J 2003/007* (2013.01); *H02J 2003/146* (2013.01); *Y04S 10/54* (2013.01); *Y04S 50/10* (2013.01)

(58) Field of Classification Search
CPC . H02J 3/008; H02J 13/0079; H02J 2003/003; H02J 2003/007; H02J 2003/146; Y04S 50/10; Y04S 10/54
USPC ........................... 700/286, 287, 291, 297, 298
See application file for complete search history.

(56) References Cited

U.S. PATENT DOCUMENTS

| 2010/0076825 | A1 | 3/2010 | Sato et al. |
| 2010/0088261 | A1* | 4/2010 | Montalvo ........................ 706/15 |
| 2011/0061176 | A1* | 3/2011 | Kappler et al. ................... 8/137 |
| 2012/0310431 | A1* | 12/2012 | Cheetham et al. ............ 700/295 |

FOREIGN PATENT DOCUMENTS

| JP | 2010-81722 A | 4/2010 |
| JP | 2010-231258 A | 10/2010 |

* cited by examiner

*Primary Examiner* — Mohammad Ali
*Assistant Examiner* — Nathan L Laughlin
(74) *Attorney, Agent, or Firm* — Crowell & Moring LLP (57) ABSTRACT

In a power equipment control system connected, via a communication network, to a system operation server of a power system and a single or a plurality of power equipments for performing power consumption or storage with interconnecting to the power system, to regulate power demand and supply balance of the power equipment, a contribution degree is obtained by preparing a demand plan of subsequent power of said power equipment; transmitting, to said power equipment, information relevant to demand regulation request to said power equipment, received from said system operation server, based on said demand plan; receiving demand regulation result of observation information on the demand regulation performed within said power equipment, based on said demand regulation request; and performing said demand regulation by said power equipment from said demand regulation result.

6 Claims, 7 Drawing Sheets

| 0601 | TIME ZONE (0602) | | | | | | |
|---|---|---|---|---|---|---|---|
| | ... | 02:15 – 02:18 | 02:18 – 02:21 | 02:21 – 02:24 | 02:24 – 02:27 | 02:27 – 02:30 | 02:30 – 02:33 | ... |
| DEMAND PLAN AMOUNT [kW] (0603) | ... | 25 | 25 | 20 | 20 | 20 | 20 | ... |

TRANSMISSION DATE AND TIME : 2011/1/1  02:14:55 — 0702
START DATE AND TIME : 2011/1/1  02:15:00 — 0703
COMPLETION DATE AND TIME : 2011/1/1  02:18:00 — 0704
REQUEST IDENTIFIER : ID000123 — 0705
REQUESTED REGULATION AMOUNT : (−)200kW — 0706

| | | 02:15 – 02:18 | 02:18 – 02:21 | 02:21 – 02:24 | 02:24 – 02:27 | 02:27 – 02:30 | 02:30 – 02:33 | |
|---|---|---|---|---|---|---|---|---|
| | | \multicolumn{6}{c}{TIME ZONE} | |
| DEMAND PLAN AMOUNT [kW] | ... | 25 | 25 | 20 | 20 | 20 | 20 | ... |
| DEMAND RESULT [kW] | ... | 24 | 21 | 19 | 17 | 18 | 17 | ... |
| REGULATION RESULT [kW] | ... | −1 | −4 | −1 | −3 | −2 | −3 | ... |
| REGULATION REQUEST DIRECTION | ... | (+) | (−) | (−) | (−) | (−) | (−) | ... |

FIG.10

CONTRIBUTION DEGREE CONFIRMATION SCREEN

| TIME ZONE | PROPOSED RATE [¥/kWh] | PERFORMED AMOUNT [kWh] | CONTRIBUTION FEE [¥] |
|---|---|---|---|
| 0:00–1:00 | 10 | – | |
| 1:00–2:00 | 20 | 1.5 | 30 |
| 2:00–3:00 | 30 | 0.5 | 15 |
| 3:00–4:00 | 20 | 1.0 | 20 |
| | | TOTAL | 350 |

CONFIRM

FIG.11

POWER EQUIPMENT CONTROL SYSTEM

BACKGROUND OF THE INVENTION

The present invention relates to a control system of power equipment for performing power consumption or storage, which is connected to a commercial power system.

To enhance efficiency of total social infrastructure, a control system has been established for remote monitoring of power equipment not owned by an electric power supplier. In particular, in expectation of prevalence of electric vehicles (hereafter referred to as EVs), attempts have been started for direct/indirect remote control of charging action of power storage and energy storage equipment. For example, a concept called V2G (Vehicle to Grid) is one such attempt.

As background art of this field, there has been described a battery charging system or a vehicle management server or the like, for more efficient utilization of an electric vehicle, where a central server performs battery charging management of an individual EV in JP-A-2010-231258. In addition, there has been proposed a method for performing charge-discharge so as to maximize charge-discharge reward, based on charge-discharge reward information dispatched, in the case of dispatching a recommendation or an order from a central server, to regulate a charge plan by respective charge equipment, to contribute to operation of a power system in JP-A-2010-81722.

SUMMARY OF THE INVENTION

Technical Problem

In JP-A-2010-231258 and JP-A-2010-81722, because power demand regulation is requested in the manner of one-way by the central server to the power equipment such as charge equipment or the like, in the case of changing a power demand plan of the power equipment, or in the case of generation of increase or decrease in practical amount of demand regulation, or the like, it is not possible to distinguish whether they depend on the owner of the power equipment or a participant cooperating to operation of the power system, thus resulting in providing contribution fee by deemed amount to the owner of the power equipment, irrespective of presence or absence of the practical demand regulation request, or size of the regulation amount to request, and the owner of the power equipment imposed the request is not secured to obtain a reasonable contribution fee, in the case where there is inconvenience in utilization (for example, insufficient residual amount of stored power) or apparatus damage (for example, battery deterioration).

Solution to Problem

To solve the above problem, the present application determines a contribution degree by preparing a demand plan of power from subsequent power demand of the power equipment; transmitting to the power equipment, information on demand regulation request so as to regulate the power demand to said power equipment from the system operation server, based on the demand plan; receiving demand regulation result as observation information on the demand regulation performed within the power equipment, based on the demand regulation request; and determining contribution degree obtained by performing the demand regulation by the power equipment from the demand regulation result.

Advantageous Effects of Invention

Each owner of the power equipment is capable of obtaining merit equivalent to practical contribution, on controlling the power equipment not owned by a power supplier, to cooperate for operation of the power system.

DESCRIPTION OF THE EMBODIMENTS

Explanation will be given below on two Examples with reference to drawings.

Example 1

Figure 1:
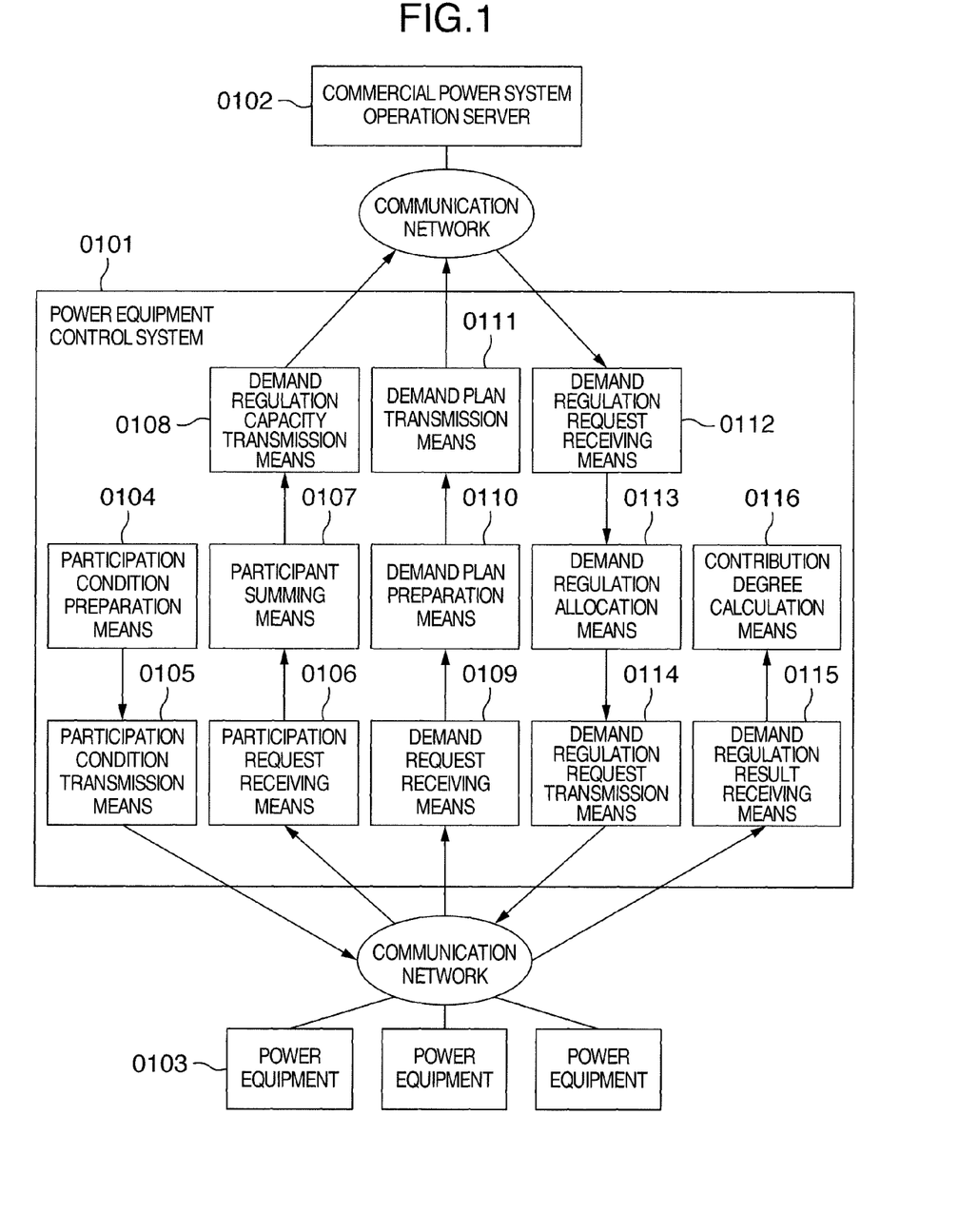
FIG. 1 is an example of a functional configuration drawing of a power equipment control system using the present invention.

In the present Example, explanation will be given on a power equipment control apparatus for performing demand regulation of the power equipment not owned by a power supplier, for frequency regulation of the whole commercial power system. FIG. 1 is an example of a functional configuration drawing of the power equipment control apparatus of the present Example.

A power equipment control system 0101 is connected, via a communication network, to a system operation server 0102 of a commercial power system and a plurality of power equipments 0103 not owned by a power supplier. The power equipment control apparatus attains demand regulation of the power equipment, by exchanging information between the system operation server and power equipment.

The system operation server controls system operation of the whole commercial power system. It has function such as preparation of a start-stop plan of a power generator from demand forecast at a stage of the previous day, economic dispatching control to the power generator to be started in operation at the appointed day. In addition, it also has function of automatic frequency control for frequency regulation of the whole system in operation at the appointed day, to perform control to eliminate demand and supply unbalance generating every minute. In the present Example, the power equipment control system is used, as a control subject of the frequency regulation, in addition to thermal power generation equipment, which has conventionally been a control subject.

Figure 2:
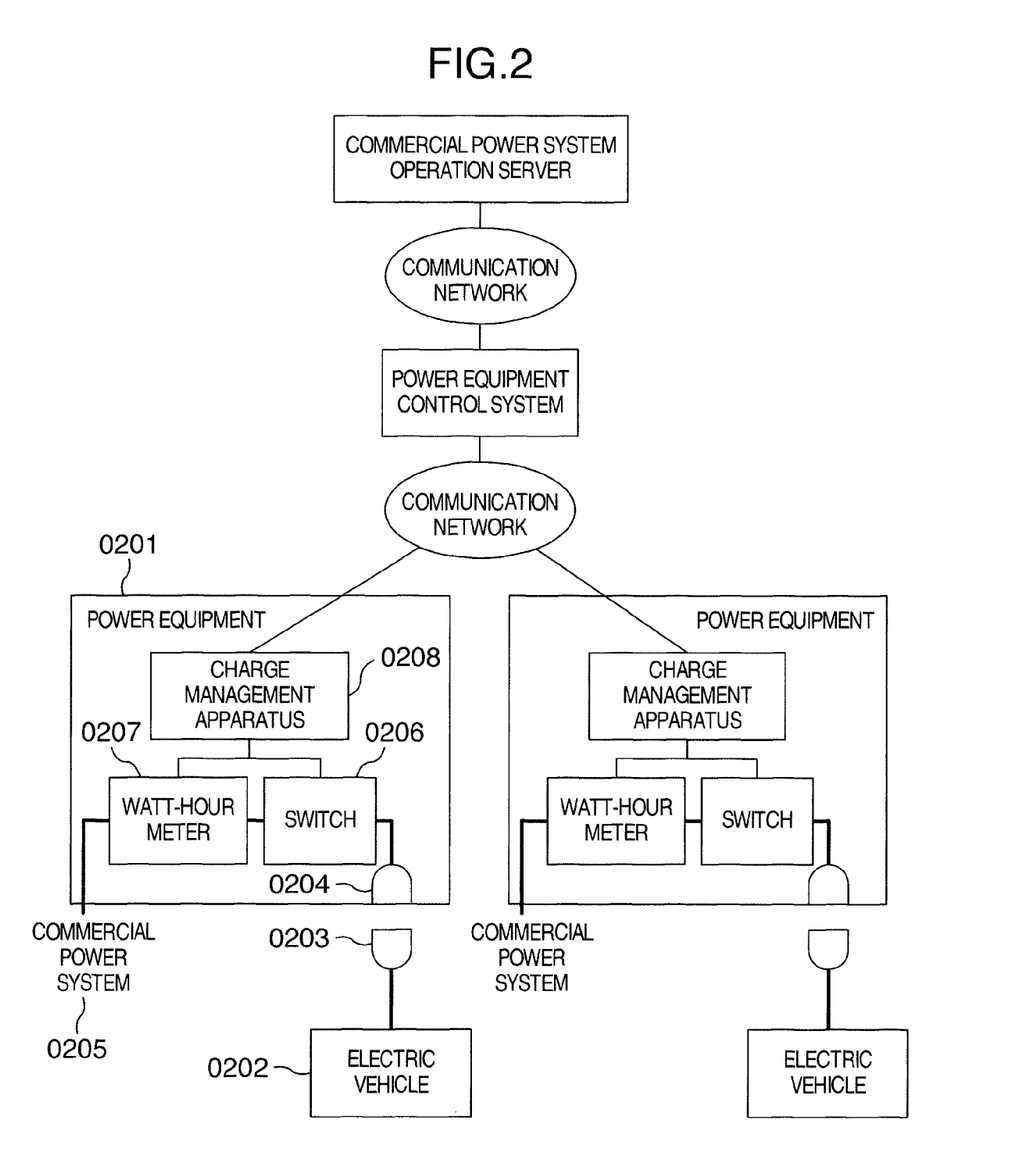
FIG. 2 is an example of an external cooperation of a power equipment control system.

Next, explanation will be given on a configuration example of the power equipment with reference to FIG. 2. A power equipment 0201 retaining a communication means with the power equipment control system has charging function of an electric vehicle 0202. It has a configuration to receive power supply from a commercial power system 0205, via a charge plug 0203 and an electrical outlet 0204. It is provided with a switch 0206 and a watt-hour meter 0207 for charge control, and a charge management apparatus 0208 has function for performing monitor of charge performing amount, and control of charge start and completion. The charge managing apparatus is in cooperation with the power equipment control system via a communication network.

Figure 3:
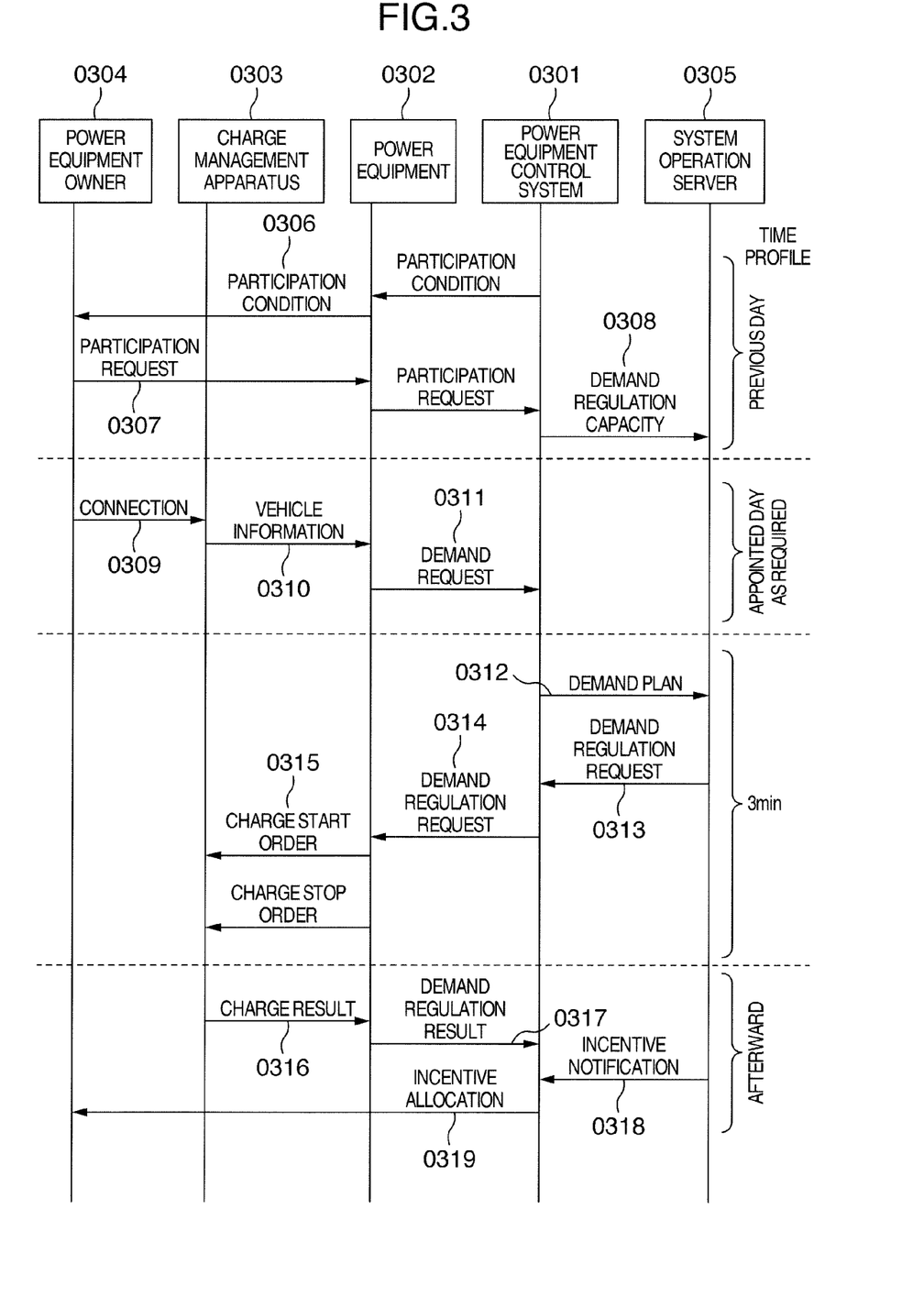
FIG. 3 is an example of a communication procedure relevant to a power equipment control system.

Explanation will be given below on action of the power equipment control system, by means of a functional configuration drawing of a power equipment control apparatus shown in FIG. 1, and a time chart drawing shown in FIG. 3.

Figure 4:
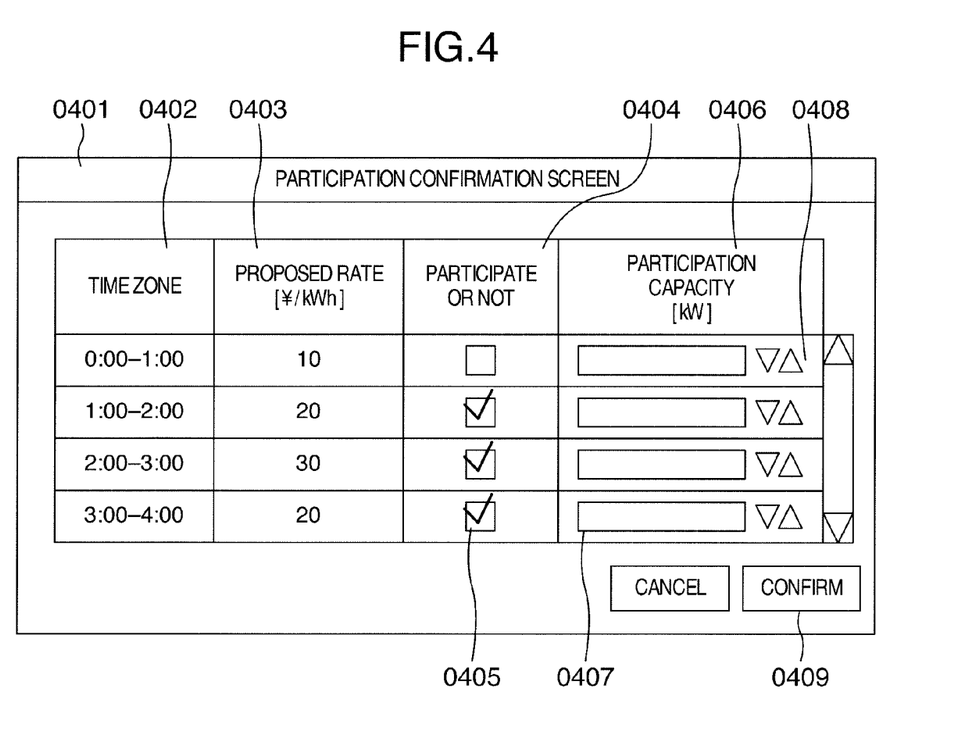
FIG. 4 is one example of a participation confirmation screen for a power equipment owner.

First of all, at a stage of the previous day, a power equipment control system 0301 transmits a protocol for providing a participation condition 0306 to power equipment 0302, using a participation condition preparation means 0104 and a participation condition transmission means 0105. FIG. 4 is one example of a screen surface mounted using Web, as for presentation of this participation condition. In a window of participation confirmation screen 0401, there is shown a proposed rate 0403 of a reward obtained in the case where power equipment cooperated about request from the power equipment control system every time zone 0402. A power equipment owner 0304 is possible to select presence or not 0404 of participation, in every time zone, by operation of a check box 0405, or to input numerical value as for a participation capacity 0406, by operation of a text box 0407 or a toggle button 0408. As for information input by these screen operations, a protocol presenting a participation request 0307 is transmitted from the power equipment 0302 to the power equipment control system 0301. The protocol presenting the participation request 0307 is received by a participation request receiving means 0106.

Figure 5:
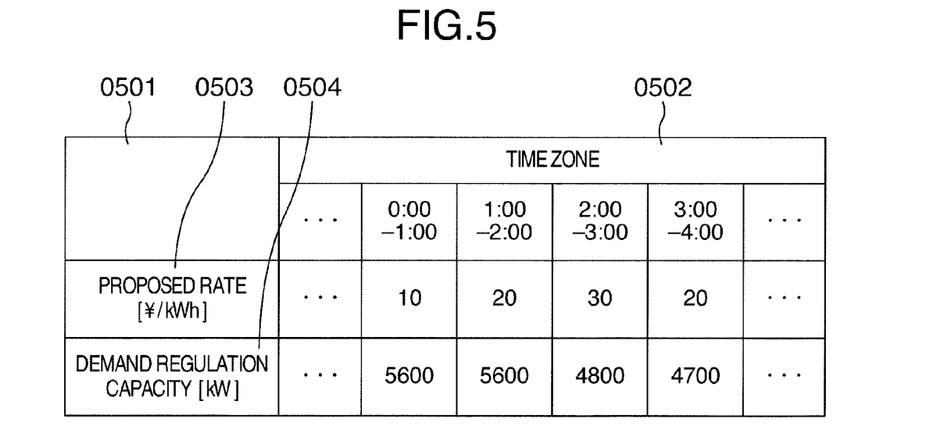
FIG. 5 is one example of a notification data table of a demand regulation capacity.

Next, also, as the processing at a stage of the previous day, demand regulation capacities are summed up by a participant summing means 0107. FIG. 5 is one example of table configuration for storing summing up result. A table 0501 records a demand regulation capacity 0504 as a summed value of participation capacities of the all power equipments, in response to a proposed rate 0503 (yen per kilowatt hour) every time zone 0502. This information is transmitted by a demand regulation capacity transmission means 0108 from the power equipment control system to the system operation server, as a protocol for connecting with a demand regulation capacity 0308.

At a stage of the appointed day, first of all, at an arbitrary timing, demand status change such as EV connection is recognized by power equipment. When a charge management apparatus 0303 senses that the power equipment owner 0304 performed an EV connection 0309 to the charge management apparatus 0303, the charge management apparatus 0303 transmits vehicle information 0310 to the power equipment 0302. The power equipment 0302 calculates power demand amount needed to charge the same EV, using the vehicle information, which is transmitted to the power equipment control system 0301, as a protocol showing a demand request 0311. Demand decrease such as disconnection of an EV is treated similarly. A demand request receiving means 0109 of the power equipment control apparatus records content of this demand request.

Figure 6:
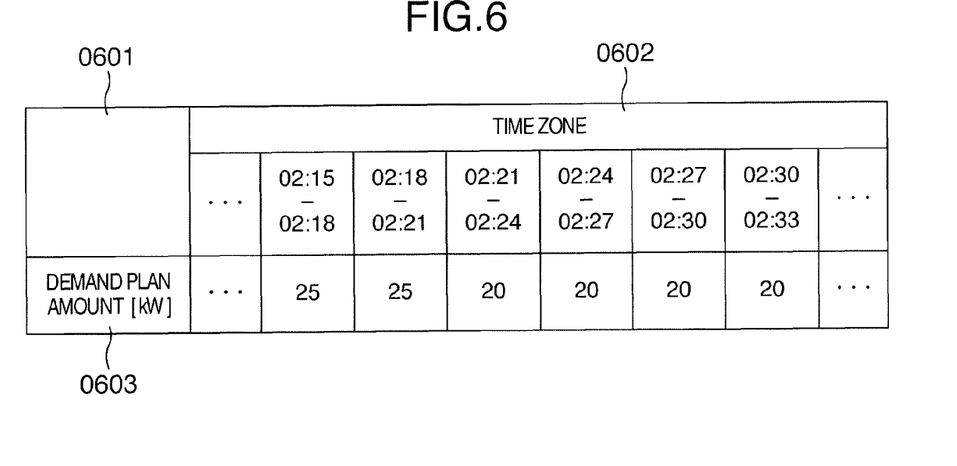
FIG. 6 is one example of a notification data table of demand plan amount.

Next, as repeated processing of a three minutes cycle in the appointed day, the power equipment control system performs preparation processing of a demand plan. Results of the demand request is summed up by a demand plan preparation means 0110 to prepare the demand plan as a perspective for the next 30 minutes. FIG. 6 is one example of a table for storing the demand plan. A table 0601 records demand plan amount as a value obtained by summing up the demand request every time zone 0602 in the future, decomposed by each 3 minutes. A demand plan transmission means 0111 transmits the demand plan prepared in this way to the system operation server, as a protocol showing a demand plan 0312.

Figure 7:
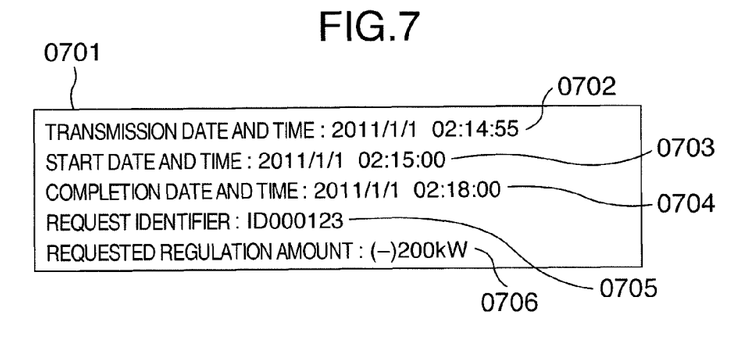
FIG. 7 is one example of data table of demand regulation request.

Then, the system operation server received this demand plan performs action to request demand and supply regulation for the same demand plan, to the power equipment control system. First of all, a demand regulation request receiving means 0112 of the power equipment control system receives a protocol showing a demand regulation request 0313 dispatched by the power system server. FIG. 7 shows one example of this message. A communication message 0701 includes a delivery date and time stamp 0702 showing delivery day and time, and a start date and time stamp 0703 for specifying time range as subject of the regulation request and a completion date and time stamp 0704, and transmits a requested regulation amount 0706, together with a request identifier 0705 subjected to uniquely index numbering (for example, generate IDs) in the system operation server. This requested regulation amount is the one determined, based on automatic frequency control for frequency regulation of the whole system retained by the power system operation server. Conventionally the automatic frequency control has been the one performed on large scale thermal power generation equipment or the like as a subject. The present Example is characterized in that the control request equivalent to automatic frequency control is transmitted for the power equipment control system controlling a plurality of power equipments. It should be noted that the requested regulation amount has both positive and negative values. The positive sign means increasing request of demand, whereas the negative sign means decreasing request of demand.

The power equipment control system received this demand regulation request allocates and transmits the same demand regulation request to a plurality of power equipments. A demand regulation allocation means 0113 allocates demand regulation request, transmitted to the whole power equipment control system, to available separate power equipment, as regulation amount. As for this allocation work, even a simple random number processing may be adopted, or such a method may also be adopted that a place having small participation result in the past is selected preferentially, so as not to raise uneven deterioration of a storage battery. The regulation amount allocated is transmitted by a demand regulation request transmission means 0114 from the power equipment control system to separate power equipment, as a protocol showing a demand regulation request 0314. A message format has a similar configuration as in a protocol showing the demand regulation request 0313 shown in FIG. 7.

A power equipment, after receiving a protocol showing the demand regulation request 0314 from the power equipment control system, performs charging control for a charge management apparatus under own control. A charge start order by amount as needed, or a charge stop order 0315 is performed in response to positive or negative sign and amount of the demand regulation request.

In this description, an allocating method of control amount inside the power equipment is the one to be performed depending on a way of thinking of an owner of the power equipment. The power equipment control system does not take part in allocation policy inside the power equipment. However, to grasp final demand result, the power equipment control system collects observation information about demand regulation performed inside the power equipment.

Figure 8:
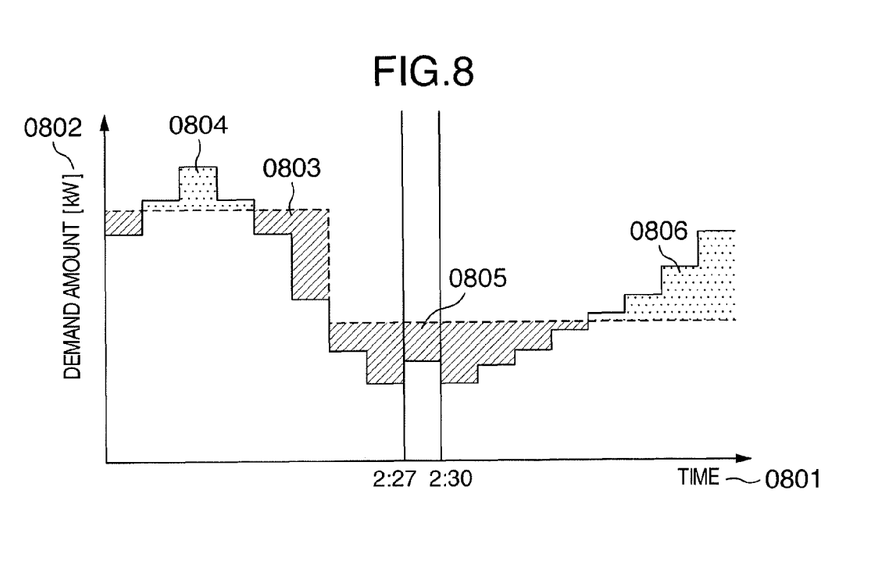
FIG. 8 is one example of time change of power consumption.

Explanation will be given below on grasping means of actual demand a stage hereafter. First of all, observation information on power amount practically used in charging is transmitted, as a protocol showing a charge result 0316, from each charge management apparatus. The power equipment sums up information of all of the charge management apparatuses to calculate demand regulation result. Time change of power consumption in one certain power equipment, before and after demand regulation, is shown, with reference to FIG. 8. The Horizontal axis represents time 0801, where a time zone of about 30 minutes around 2:30 is shown. The vertical axis represents a demand amount 0802, meaning consumed power averaged for 3 minutes. In this drawing, a dotted-line demand amount change curve (i.e. a dotted-line curve of demand change) 0803 represents content of the demand plan, while a solid-line demand amount change curve (i.e. a solid-line curve of demand change) 0804 represents content of the demand result. As shown in this drawing, an area 0806, where the power consumption result is over power consumption in a plan stage, and on a contrary, an area 0805, where the power consumption result is below power consumption in a plan stage, are obtained. For example, in a time zone from 2:27 to 2:30, the practical result is below the plan. These areas mean result of practical demand regulation, in response to demand regulation request from the power equipment control system.

Figure 9:
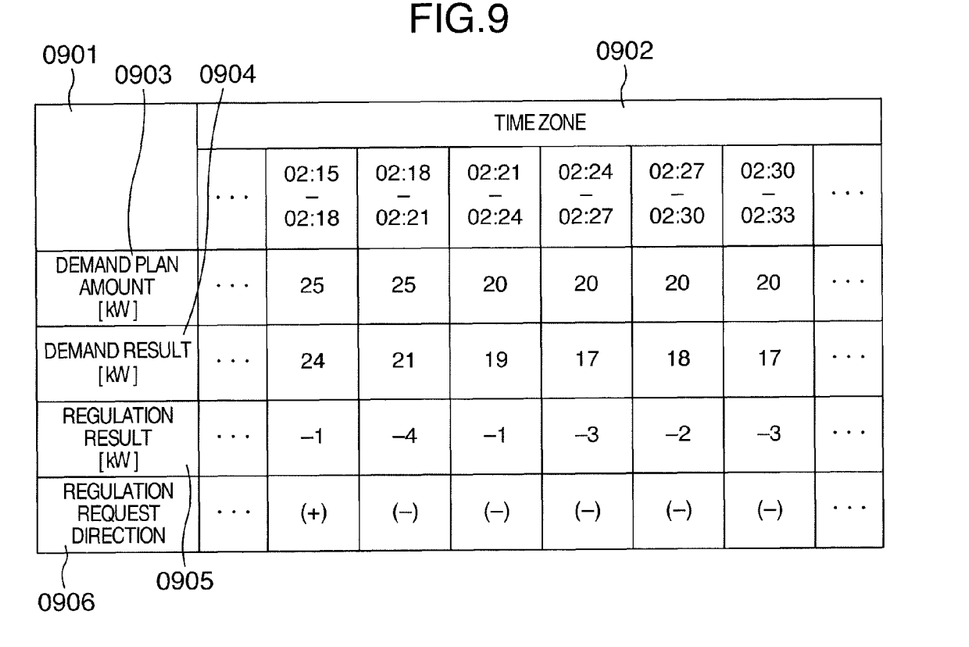
FIG. 9 is one example of reporting data table of demand regulation results.

FIG. 9 is an example of a data table storing demand regulation results. In a data table 0901, a demand plan amount 0903, and a demand result amount 0904, as well as a regulation result 0905 as difference thereof are stored, in every time zone 0902 decomposed in a unit of 3 minutes. A regulation request direction 0906 corresponds to a positive or negative sign of the requested regulation amount 0706 in the demand regulation request. The case where the regulation result 0905 and the regulation request direction 0906 have the same sign means contribution of the power equipment to the demand regulation request. For example, the time zone from 2:27 to 2:30 means continued contribution for 3 minutes by an amount of −2 kW.

A configuration by such a data fulfills an important role in system processing hereafter, and such a content of data table of FIG. 9 is transmitted using a protocol showing a demand regulation result 0317. The power equipment control system grasps this demand regulation result by a demand regulation result receiving means 0115.

Figure 10:
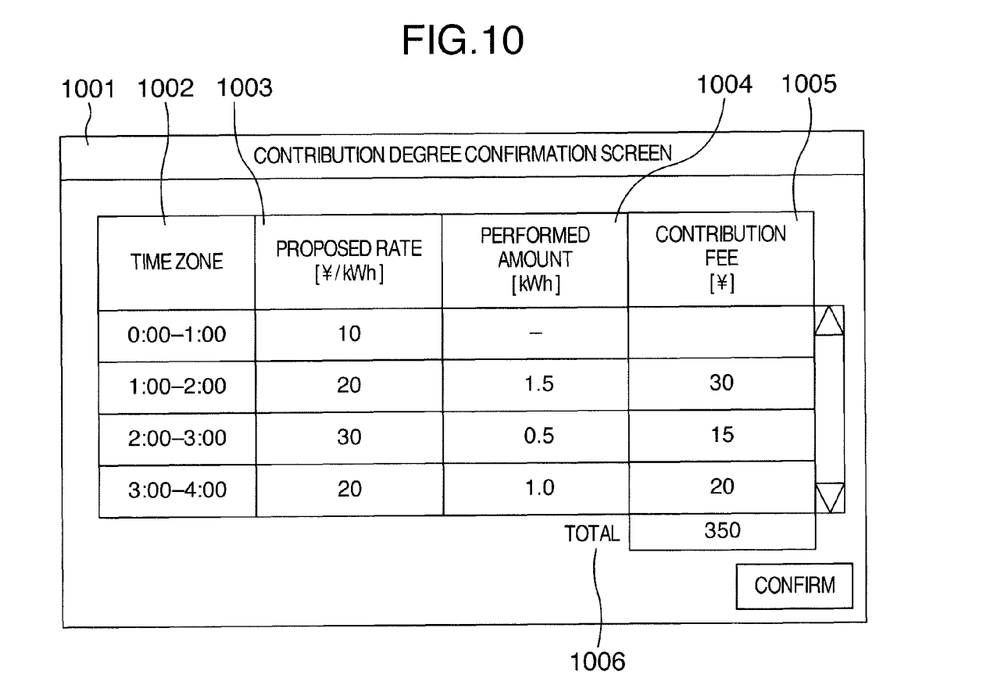
FIG. 10 is one example of a confirmation screen of contribution degree for a power equipment owner.

Explanation will be given on a procedure for quantitative determination of a contribution degree to respective power equipment, based on the demand regulation result, as the last explanation of Example 1. The contribution degree by respective power equipment is quantitatively determined by a contribution degree calculation means 0116 to sum information to be able to provide to the owner of the power equipment. FIG. 10 is one example of a Web screen to be provided to the owner of the power equipment. In a window of a contribution degree confirmation screen 1001, a proposed rate 1003 already provided as participation condition, a performed amount 1004 and a contribution fee 1005 are shown, by every time zone 1002 in a unit of 30 minutes. In the present description, the amount performed is a summed up value in a time width of 30 minutes, provided that in the case where the regulation result 0905 and the regulation request direction 0906 have the same sign a positive value is taken, while in the different case a negative value is taken, in converting demand regulation result [kW] by each 3 minutes to power amount [kWh]. In addition, the contribution degree is a value determined from the performed amount multiplied with the proposed rate. Total money of contribution fee for one day 1006 corresponds to a price obtained by the power equipment owner for performing demand regulation of the power equipment to cooperate in operation of the power system during that one day.

By constructing such the power equipment control system as described above, the owner of the power equipment becomes possible to grasp quantitatively the contribution degree in response to demand regulation amount performed to own power equipment.

The owner of the power equipment performs work to obtain a monetary value equivalent to the contribution degree, as an external procedure of the power equipment control system. At the inside of the contribution degree calculation means 0116, information equivalent to the contribution degree is stored. By transmitting information equivalent to said contribution degree regularly to an external financial institution, using a means other than the above-described communication apparatus, payment of the monetary value is received from the same financial institution. The monetary value may be alternative concept such as an "Eco Point". In addition, in the case where the power equipment control system does not have a communication equipment for on-line connection with a financial institution, it is also possible to request a settlement to the financial institution separately, by performing a job for reading information equivalent to the contribution degree from the power equipment control system using a manual work in a regular interval of once a month or the like.

In this way, after performing demand-supply control for the whole power system by the power equipment control system, by grasping and recording the contribution degree, the owner of the power equipment becomes possible to obtain the justifiable monetary value for inconvenience in utilization (for example, insufficient residual amount of stored power) or apparatus damage (for example, battery deterioration). By constructing such a power control system, understanding and cooperation of the owner of the power equipment can be obtained widely for controlling the power equipment to operate the power system.

It should be noted that, in this Example, a confirmation example of the contribution degree on a communication circuit by a Web screen was shown, however, this confirmation work of the contribution degree may be performed by documentation-based exchange.

Example 2

Figure 11:
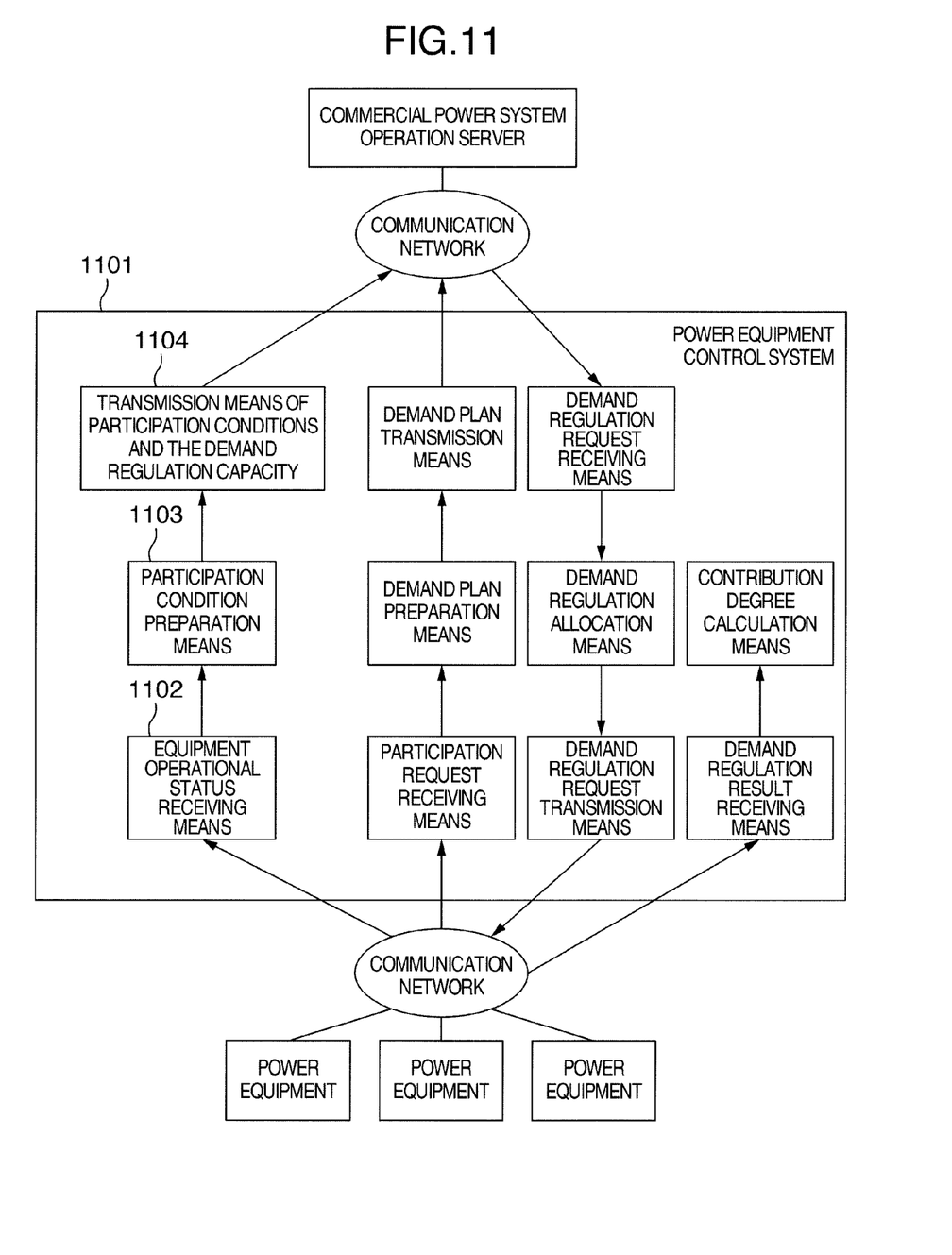
FIG. 11 is an example of a functional configuration drawing of a power equipment control system using present invention.

Explanation will be given, in the present Example, on a form for providing the participation condition from the power equipment control system to the system operation server, different from a form for providing the participation condition from the power equipment control system to the power equipment like in Example 1. FIG. 11 is an example of a functional configuration drawing of the power equipment control system 1101 in Example 2. In the power equipment control system 0101 of FIG. 1, explanation is omitted as for portions having the same function as in FIG. 1 already explained.

An equipment operational status receiving means 1102 grasps a power consumption status and demand regulatable amount, and cost relevant to the regulation as for a plurality of power equipments. When the power equipment is an EV charge management apparatus, it recognizes vehicle information of the EV to grasp the power consumption status and demand regulatable amount, as well.

In the participation condition preparation means 1103, data to provide condition to participate in demand regulation activity is prepared for the system operation server. Based on the results of the equipment operational status receiving means 1102, in a similar data table as in FIG. 5, the regulatable amount, and a value of cost relevant to regulation added with predetermined profit are summed, by every time zone of 30 minutes, as participation conditions.

In participation conditions and the demand regulation capacity transmission means 1104, regulatable amount calculated in the participation condition preparation means 1103 and participation conditions are transmitted to the system operation server.

In the system operation server, presentation of the participation conditions and the demand regulation capacity is received from one or a plurality of power equipment control systems. Accordingly, in the case where automatic frequency control for frequency regulation of the whole system is necessary, the one with the lowest participation condition is selected sequentially among the power equipment control systems available at the relevant time zone. Similarly as in FIG. 1, the demand regulation request is transmitted to the power equipment control system selected here.

In Example 2, such a procedure is not required to recruit participants in the power equipment control system, as in Example 1, and thus a configuration is simplified. On the other hand, in the system operation server, such processing is required to select and discard conditions proposed by a plurality of power equipment control systems.

INDUSTRIAL APPLICABILITY

In any case, similarly as in Example 1, also in Example 2, the owner of the power equipment becomes possible to obtain contribution fee corresponding to regulation amount performed to own power equipment. It becomes possible to widely obtain understanding and cooperation of the owner of the power equipment, for mechanism to control the power equipment for operation of the power system.

The invention claimed is:

1. A process of regulating power demand and supply balance of power by way of a power equipment control system connected, via a communication network, to a system operation server of a power system and power equipment for performing power consumption or storage, the process comprising:
   preparing a demand plan of subsequent power of said power equipment;
   transmitting, to said power equipment, information relevant to a demand regulation request for said power equipment from said system operation server, based on said demand plan;
   receiving a demand regulation result as observation information about demand regulation performed within said power equipment based on said information relevant to said demand regulation request; and
   determining a contribution degree obtained by performing said demand regulation within said power equipment from said demand regulation result;
   wherein the power equipment control system further transmits said contribution degree to said power equipment;
   wherein the power equipment control system further transmits, to said power equipment, participation conditions representing a condition for receiving said demand regulation request; and
   wherein said participation conditions include a proposed rate to be used for calculation of a reward, obtained by participation in demand regulation of power relevant to said demand regulation request, confirmation of participation or not in said demand regulation, and participation capacity, representing power demand amount of said power equipment, of every predetermined time zone in a set of predetermined time zones.

2. The process according to claim 1, wherein the power equipment control system further receives operational information, representing an operational status of said power equipment transmitted from said power equipment, and prepares participation conditions, representing at least one condition for receiving said demand regulation request, based on said operational information.

3. The process according to claim 2, wherein preparing the demand plan is performed by summing demand requests representing power demand requests of a plurality of units of said power equipment, and dividing a sum of said demand requests into a demand request for each predetermined time zone in a set of predetermined time zones.

4. The process according to claim 3, further comprising:
   receiving said demand regulation request transmitted by said system operation server;
   allocating a requested regulation amount of power demand relevant to said demand regulation request to a plurality of power equipment units; and
   transmitting the demand regulation request relevant to said requested regulation amount allocated to the plurality of the power equipment units.

5. The process according to claim 4, wherein the requested regulation amount of power demand relevant to said demand regulation request is decided based on power system frequency regulation retained by said system operation server.

6. The process according to claim 4, wherein allocation of said requested regulation amount is decided based on processing for selecting by giving priority to a plurality of power equipment units or for random selection.

* * * * *